June 16, 1959
J. M. HORN
2,890,729
CUT-OFF GAUGE
Filed Feb. 10, 1958
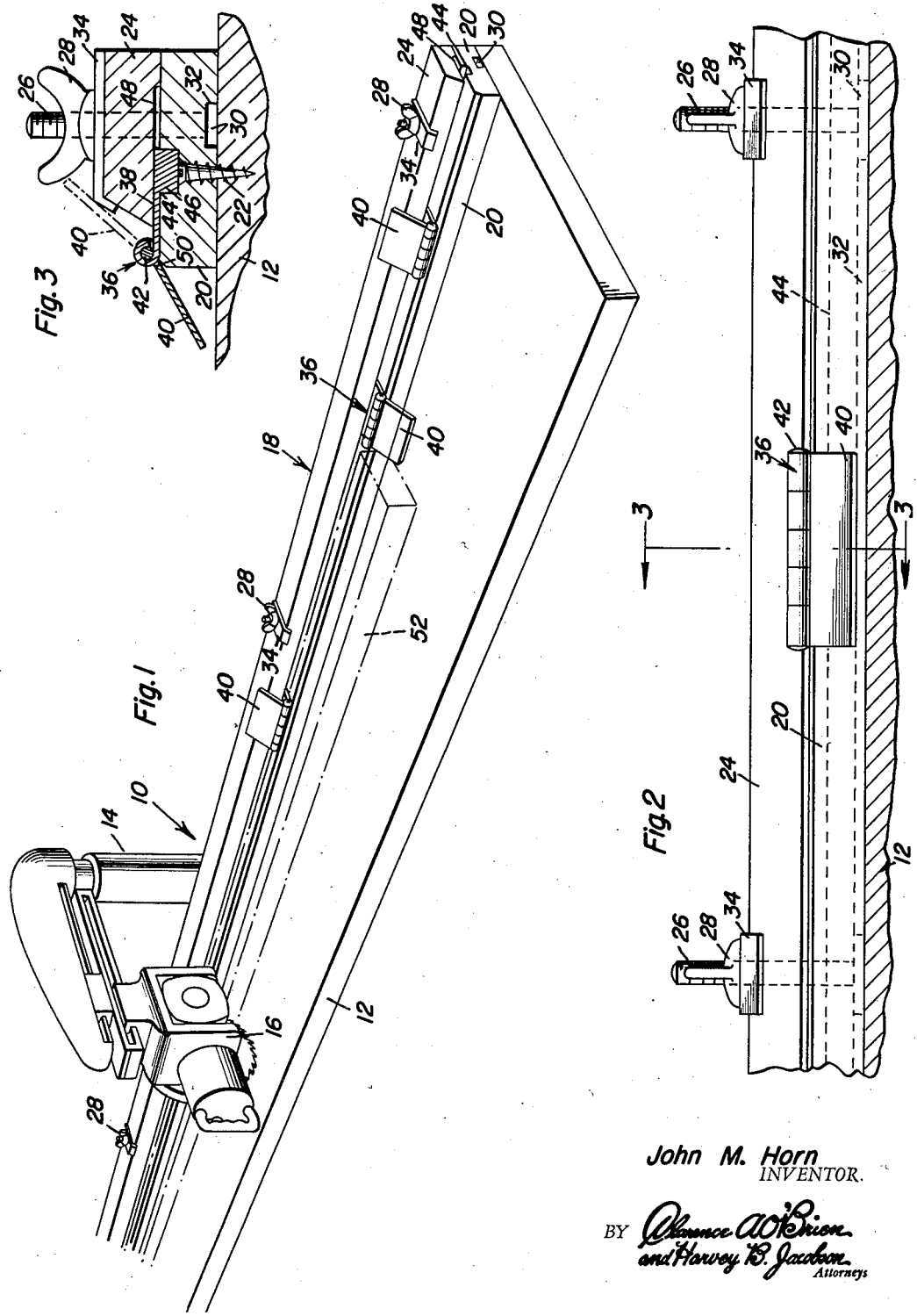
John M. Horn
INVENTOR.

United States Patent Office 2,890,729
Patented June 16, 1959

2,890,729

CUT-OFF GAUGE

John M. Horn, Hamilton, Ohio, assignor to The John M. Horn Lumber Co., Hamilton, Ohio, a corporation of Ohio Application February 10, 1958, Serial No. 714,391

4 Claims. (Cl. 143—168)

This invention relates in general to new and useful improvements in gauges, and more specifically to an improved cut-off gauge.

In many types of industries it is desired that stock be cut to predetermined lengths. In order to accomplish this, it is necessary that stop members be placed at selected intervals along the table of a power tool so that the material to be cut off may engage the stop members thus producing lengths of material which are the desired lengths. This is particularly true in the building industries where it is desired to cut boards to exact lengths. While heretofore there have been devised gauges of all types, such gauges have been both expensive and difficult to handle.

It is therefore the primary object of this invention to provide an improved cut-off gauge which is of an extremely simple construction and which is so constructed it may be readily reset without the use of tools of any kind.

Another object of this invention is to provide an improved cut-off gauge which has substantially no play and thus may be readily set without having to take into consideration the tolerance required by the play in the gauge.

Another object of this invention is to provide an extremely simple cut-off gauge which may be constructed from readily obtainable materials so that the cost of manufacture thereof is much less than existing gauges and therefore may be a commercial success.

A further object of this invention is to provide an improved cut-off gauge, the cut-off gauge including simply a bed plate, a clamp plate overlying the bed plate and hinge-like gauge members, each of the gauge members including one leaf which is clamped between the clamp plate and the bed plate and a second leaf which is swingable into alignment with stock to be cut off to form a stop therefor.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of a cut-off saw and its table and shows mounted on the table of the cut-off saw the cut-off gauge which is the subject of this invention;

Figure 2 is a longitudinal sectional view taken through the table of Figure 1 and shows in elevation a portion of the cut-off gauge; and Figure 3 is an enlarged fragmentary sectional view taken substantially upon the plane indicated by the section line 3—3 of Figure 2 and shows the specific details of construction of the cut-off gauge.

Referring now to the drawings in detail, it will be seen that there is illustrated a cut-off saw assembly which is referred to in general by the reference numeral 10. The cut-off saw assembly 10 includes a bed 12 which has mounted relative thereto a saw support 14 carrying a saw unit 16 which is mounted for movement transversely of the table 12.

Mounted on the rear edge portion of the table 12 is the cut-off gauge which is the subject of this invention, the cut-off gauge being referred to in general by the reference numeral 18. The cut-off gauge 18 includes an elongated strip 20 which will be considered to be a bed plate. The strip 20 is secured to the table 12 by means of suitable fasteners 22 which are spaced longitudinally of the bed plate, as is best shown in Figure 3.

Overlying the bed plate and cooperating therewith is an elongated strip in the form of a clamp plate 24. The clamp plate 24 is retained in place by means of elongated bolts 26 which are provided at their upper ends with wing nuts 28. The bolts 26 have lower heads 30 which are received in a longitudinally extending recess 32 formed in the underside of the bed plate 20. Carried by each of the bolts 26 is a clamp strap 34 which is engaged by the wing nut 28.

Clamped between the clamp plate 24 and the bed plate 20 and spaced longitudinally thereof is a plurality of gauge members each of which is referred to in general by the reference numeral 36. Each gauge member 36 is in the form of a hinge-like member and includes a mounting leaf 38 and a work engaging leaf 40, the leaves being connected together by a hinge pin 42.

Formed in the upper part of the bed plate 20 is a longitudinally extending recess 44 in which there is received a projecting lug 46 on the mounting leaf 38 so as to position the gauge member 36. Also, the forward and underside portion of the clamp plate 24 is cut away as at 48 to provide clearance for the mounting leaf 38 and to facilitate the clamping thereof.

At this time it is pointed out that the upper forward corner of the bed plate 20 is cut away as at 50 to permit the work engaging leaf 40 to project downwardly into a work engaging position. Also, the clamp plate 24 is of a lesser width than the bed plate 20 so as to provide a proper clearance and a rest for the work engaging leaf 40 when it is in its inoperative position, as is best shown in dot-dash lines in Figure 3.

In the use of the cut-off gauge 18, the desired number of gauge members 36 are positioned between the bed plate 20 and the clamp plate 24. By loosening up on the wing nut 28, the clamping action of the clamp plate 24 may be released and the gauge members 36 slid longitudinally along the bed plate 20 to their desired positions. Then those gauge members 36 which are not being used have their work engaging leaves 40 swung upwardly to their out-of-the-way positions and that gauge member 36 which is being used, has its work engaging leaf 40 swung downwardly towards the table 12. With the forward edge of the bed plate 20 forming a back stop for material to be cut, such as the board 52, the work engaging leaf 40 is in position to engage an end of the board 52 remote from the saw unit 16. Thus the operator of the saw assembly 10 merely pushes the board 52 to the right, as viewed in Figure 1, until it engages the gauge member 36 and then moves the saw unit 16 rearwardly to cut off the board which will result in a board of the desired length. If boards of other lengths are required, the work engaging leaf of the gauge member 36 previously in use is swung upwardly to the out-of-the-way position and one of the other gauge members 36 has its work engaging leaf 40 swung downwardly, as is required.

From the foregoing description of the cut-off gauge 18, it will be readily apparent that it is of a simple construction and may be manufactured at a relatively low cost. Further, because of its particular construction, the gauge members 36 may be readily positioned therealong accurately and because of the particular construction of the gauge members 36, once they have been set, they will be retained in that position and there will be no tolerances due to the play in the gauge members.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cut-off gauge comprising an enlongated bed plate, an elongated clamp plate overlying said bed plate, and a plurality of gauge members, said gauge members being spaced longitudinally of said bed plate and retained in position by said clamp plate, said gauge members each including a mounting leaf and a work engaging leaf, a longitudinally extending hinge pin hingedly connecting said work engaging leaf to said mounting leaf.

2. A cut-off gauge comprising an elongated bed plate, an elongated clamp plate overlying said bed plate, and a plurality of gauge members, said gauge members being spaced longitudinally of said bed plate and retained in position by said clamp plate, said gauge members each including a mounting leaf and a work engaging leaf, a longitudinally extending hinge pin hingedly connecting said work engaging leaf to said mounting leaf, said clamp plate being of a lesser width than said bed plate to provide clearance for said work engaging leaf when in a retracted position.

3. A cut-off gauge comprising an elongated bed plate, an elongated clamp plate overlying said bed plate, and a plurality of gauge members, said gauge members being spaced longitudinally of said bed plate and retained in position by said clamp plate, said gauge members each including a mounting leaf and a work engaging leaf, a longitudinally extending hinge pin hingedly connecting said work engaging leaf to said mounting leaf, said bed plate having a longitudinally extending recess opening through the upper surface thereof, each of said mounting leaves including a depending lug seated in said recess and positioning said gauge members.

4. A cut-off gauge comprising an elongated bed plate, an elongated clamp plate overlying said bed plate, and a plurality of gauge members, said gauge members being spaced longitudinally of said bed plate and retained in position by said clamp plate, said gauge members each including a mounting leaf and work engaging leaf, a longitudinally extending hinge pin hingedly connecting said work engaging leaf to said mounting leaf, said bed plate having a longitudinally extending recess opening through the upper surface thereof, each of said mounting leaves including a depending lug seated in said recess and positioning said gauge members, said clamp plate being of a lesser width than said bed plate to provide clearance for said work engaging leaf when in a retracted position.

References Cited in the file of this patent

UNITED STATES PATENTS

| | | |
|---|---|---|
| 564,118 | Steveley | July 14, 1896 |
| 2,787,301 | Anderson | Apr. 2, 1957 |